(12) United States Patent
Mahaffy

(10) Patent No.: US 8,137,604 B2
(45) Date of Patent: Mar. 20, 2012

(54) METHODS OF CREATING SOFT FORMED HOSES AND MOLDS

(75) Inventor: Matthew James Mahaffy, Tipton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 140 days.

(21) Appl. No.: 12/547,546

(22) Filed: Aug. 26, 2009

(65) Prior Publication Data

US 2011/0049754 A1    Mar. 3, 2011

(51) Int. Cl.
*B29C 33/12* (2006.01)
(52) U.S. Cl. .. 264/219; 264/313; 264/317; 264/DIG. 44
(58) Field of Classification Search .................. 264/219, 264/313, 317, DIG. 44; 700/98, 119
See application file for complete search history.

(56) References Cited

U.S. PATENT DOCUMENTS

| | | | |
|---|---|---|---|
| 4,056,596 A | 11/1977 | Pahl | |
| 4,174,365 A | 11/1979 | Pahl | |
| 6,117,612 A | 9/2000 | Halloran et al. | |
| 6,159,411 A | 12/2000 | Kulkarni et al. | |
| 6,547,210 B1 * | 4/2003 | Marx et al. | 249/175 |
| 6,547,908 B2 | 4/2003 | Keyes et al. | |
| 6,910,876 B2 * | 6/2005 | Ainsworth et al. | 425/393 |
| 7,229,586 B2 | 6/2007 | Dunlap et al. | |
| 7,284,589 B2 | 10/2007 | Pfeifer et al. | |
| 2003/0090034 A1 | 5/2003 | Mulhaupt et al. | |
| 2005/0023721 A1 * | 2/2005 | Cominsky | 264/219 |
| 2005/0205232 A1 | 9/2005 | Wang et al. | |
| 2005/0269055 A1 | 12/2005 | Frasier | |
| 2009/0014907 A1 | 1/2009 | Kuo | |

* cited by examiner

Primary Examiner — Maria Veronica Ewald
Assistant Examiner — Robert J Grun
(74) Attorney, Agent, or Firm — Dinsmore & Shohl LLP

(57) ABSTRACT

A method of forming hoses is provided. The method includes generating a virtual design for at least one of a solid durable core and a hollow sacrificial core. At least one of the solid durable core and the hollow sacrificial core is formed using rapid prototyping. A mold cavity is formed using the solid durable core. The hose is formed about the hollow sacrificial core with the hollow sacrificial core in the mold cavity.

16 Claims, 10 Drawing Sheets

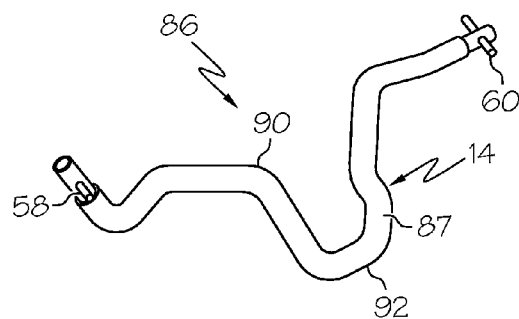
FIG. 6A
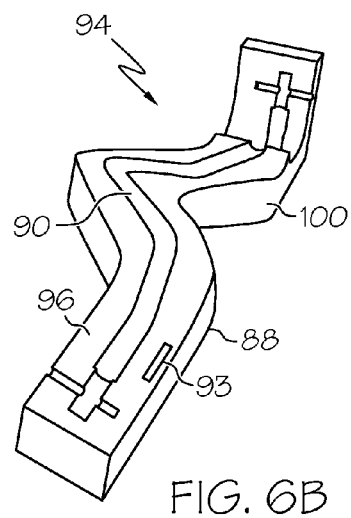
FIG. 6B
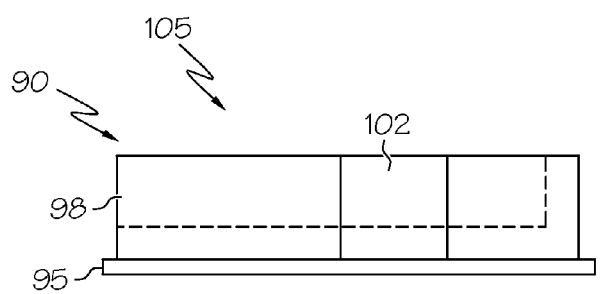
FIG. 6C
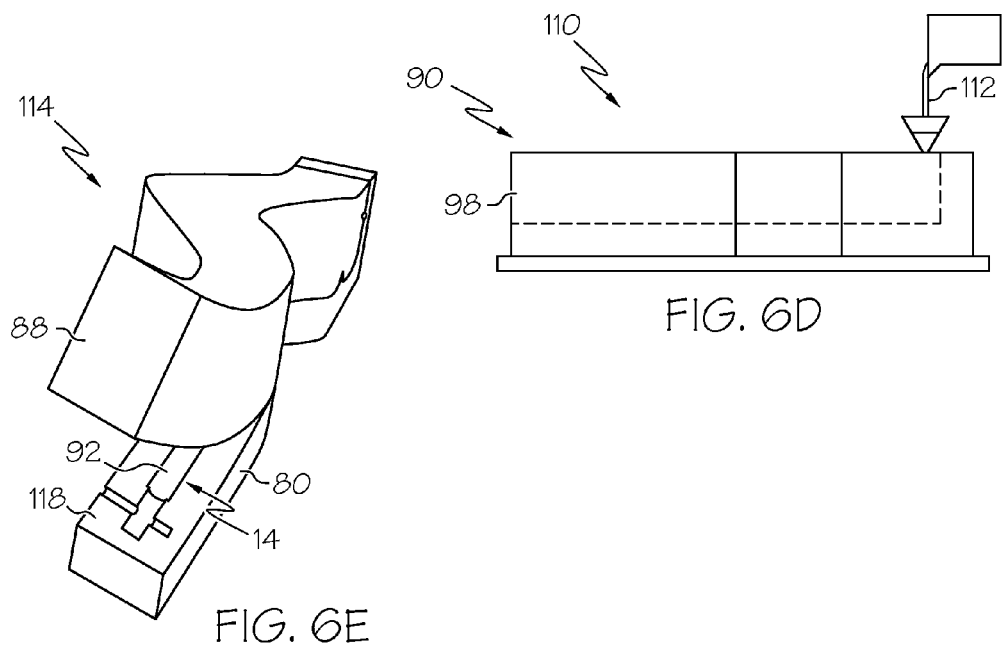
FIG. 6D
FIG. 6E

METHODS OF CREATING SOFT FORMED HOSES AND MOLDS

TECHNICAL FIELD

The present specification generally relates to methods of generating hoses and, more specifically, to creation of soft formed hoses and mold forming methods.

BACKGROUND

Hoses come in a variety of shapes and sizes and for numerous uses. As one exemplary use, vehicles utilize hoses, for example, to move fluid around the vehicle. Such vehicle hoses can be irregular in shape, having any number of diameter changes, turns, etc. Typical methods of forming hoses include mandrel manufacturing processes where hose material is applied to a mandrel. Such mandrel manufacturing processes are limited in the types of hose shapes that can be produced as the formed hose must be removed from the mandrel. Additionally, in some instances, a prototype hose may be needed for testing of the hose. However, it can take weeks to form such a prototype using conventional manufacturing techniques. Accordingly, other hose manufacturing processes are desired.

SUMMARY

In one embodiment, a method of forming hoses is provided. The method includes generating a virtual design for at least one of a solid durable core and a hollow sacrificial core; forming at least one of the solid durable core and the hollow sacrificial core using rapid prototyping; forming a mold cavity using the solid durable core; and forming the hose about the hollow sacrificial core with the hollow sacrificial core in the mold cavity.

In another embodiment, a method of forming a mold for use in forming a hose is provided. The method includes generating a virtual design for a solid durable core; generating a virtual design for a hollow sacrificial core; forming at least one of the solid durable core and the hollow sacrificial core using rapid prototyping; forming a mold cavity using the solid durable core; and locating the hollow sacrificial core in the mold cavity.

In another embodiment, a method of forming hoses is provided. The method includes forming a solid durable core and a hollow sacrificial core using rapid prototyping; forming a mold cavity using the solid durable core; locating the hollow sacrificial core in the mold cavity, the hollow sacrificial core and mold cavity sized to provide a hose forming volume in the mold cavity with the hollow sacrificial core located in the mold cavity; and providing a hose forming material in the hose forming volume such that the hose forming material surrounds the hollow sacrificial core.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein relate to hose forming methods, which generally provide for rapid prototyping of flexible hoses having preselected wall thicknesses, shapes and material properties. While the methods described herein are generally suitable for relatively low volume, prototyping applications, they may be suitable for final production of the flexible hoses as well. The methods can be suitable for forming flexible hoses having relatively complex shapes, such as numerous bends, changing diameters, etc.

Figure 1:
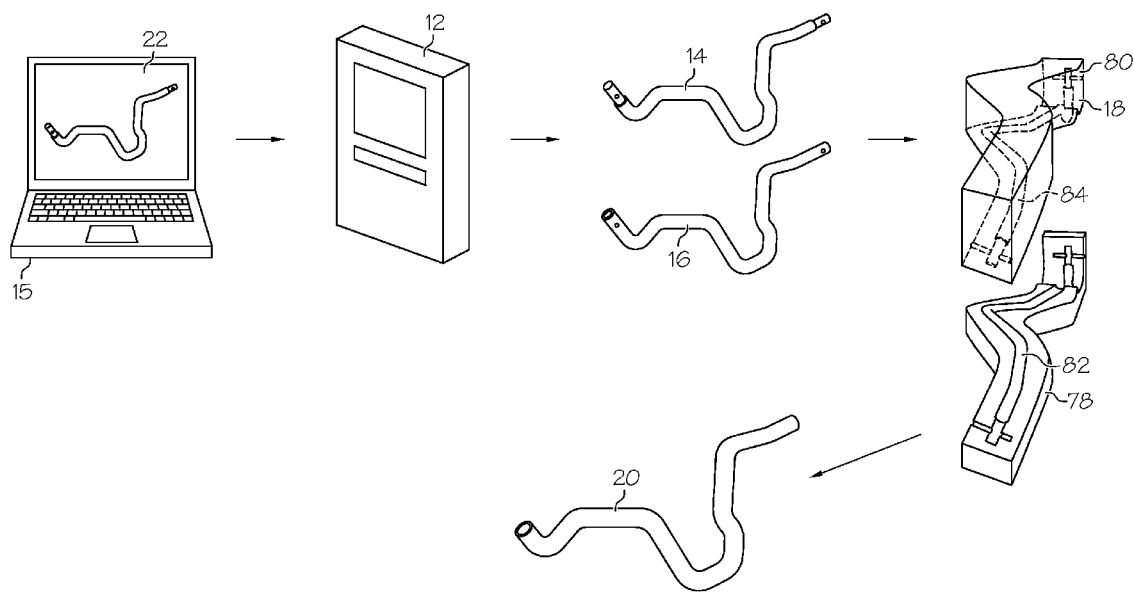
FIG. 1 illustrates a mold and hose forming method according to one or more embodiments shown and described herein.

Referring to FIG. 1, an exemplary embodiment of a hose forming method 10 generally includes use of a rapid prototyping machine 12 in generating cores 14 and 16 for use in producing a mold 18 and the flexible hoses 20. As used herein, the term "rapid prototyping" generally refers to automatic construction of physical objects using additive manufacturing technology, such as stereolithography (SLA). Other rapid prototyping technologies include selective laser sintering (SLS), electron beam melting (EBM) and fused deposition modeling (FDM).

In the hose forming method 10 of FIG. 1, a virtual design 22 of a solid, durable core 14 is generated using any suitable computer aided design (CAD) or animation modeling software running on a computer 15. As used herein, the term "durable" generally refers to a part that can be reused (e.g., to form multiple molds). The virtual design 22 may reflect the desired exterior shape of the flexible hoses 20, which may, in some embodiments, account for final dimensions of the flexible hoses 20. Once the virtual design 22 is produced using the CAD or animation modeling software, the rapid prototyping machine 12 reads in data from the virtual design. One exemplary interface between CAD software and the rapid prototyping machines 12 is the STL file format, which approximates the shape of a part or assembly using triangular facets.

Figure 2:
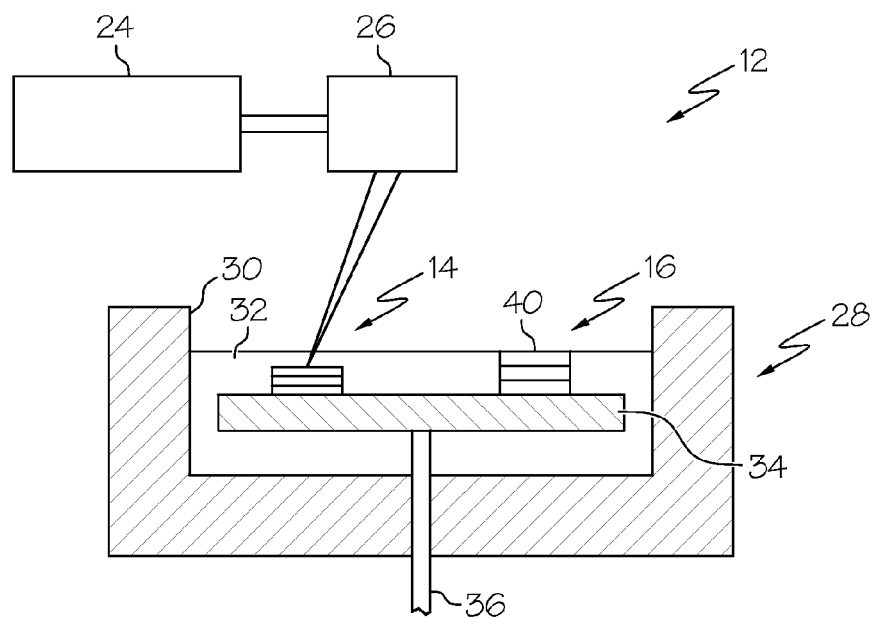
FIG. 2 illustrates a system and method for forming a solid durable core and a hollow sacrificial core using stereolithography according to one or more embodiments shown and described herein.

The rapid prototyping machine 12, in some embodiments, may be an SLA machine, which may utilize a liquid UV-curable photopolymer resin and a UV laser to build the solid durable core 14. FIG. 2 illustrates diagrammatically operation of the exemplary SLA machine. The SLA machine 12 may generally include a laser-generating apparatus 24, a scanner system 26 and a part station 28. The part station 28 may include a tank 30 holding the liquid UV-curable photopolymer resin 32, a platform 34 and a moveable piston 36 connected to the platform 34. As illustrated in FIG. 2, the scanner system 26 directs a laser beam 38 as required by the virtual design 22 to form multiple layers 40 of solidified resin. The multiple layers 40 of solidified resin together form the solid durable core 14.

In some embodiments, the SLA machine 12 may build both the solid durable core 14 and the core 16 (a hollow, sacrificial core) simultaneously. As used herein, the term "sacrificial" refers to a part that, once used to form a hose, is no longer suitable for forming another hose. In some embodiments, multiple solid durable cores 14 and/or hollow sacrificial cores 16 may be created simultaneously using the SLA machine 12 in accordance with the virtual design 22. The solid durable core 14 and the hollow sacrificial core 16 may be formed strong enough to be machined or otherwise further worked and can be created in about one day or less.

Figure 3:
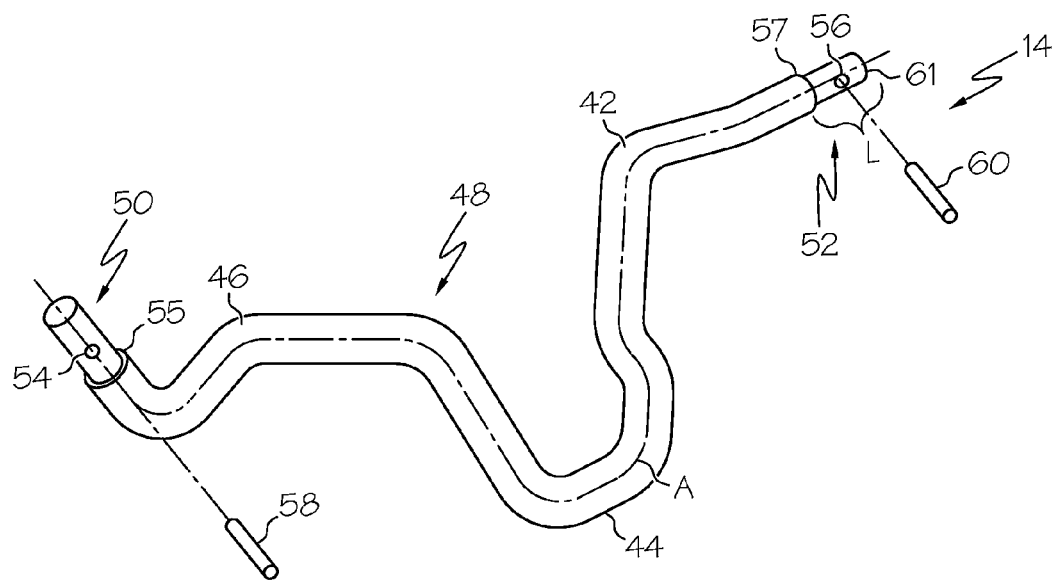
FIG. 3 illustrates a solid durable core according to one or more embodiments shown and described herein.

Referring to FIG. 3, one exemplary embodiment of the solid durable core 14 formed using, for example, the SLA machine 12 is illustrated. The solid durable core 14 is not straight and is relatively tortuous in shape, having a number of bends (e.g., bends 42 and 44). As can be seen, one or more of the bends (e.g., bend 44) of the solid durable core 14 may be greater than 90 degrees, while other bends (e.g., bend 46) may be less than 90 degrees. The number and degree of the bends may depend, at least in part, on the particular vehicle requirements for the hose.

The solid durable core 14 may have a main, hose-forming portion 48 located between locking feature portions 50 and 52. The locking feature portions 50 and 52 may extend outwardly from ends 55 and 57 of the hose-forming portion 48 in the direction of a central axis A of the solid durable core 14. As one example, the locking feature portions 50 and 52 may each extend a length L between about 50 mm and about 75 mm beyond the respective ends 55 and 47 of the hose forming portion 48, however, other extension distances less than 50 mm and greater than 75 mm can be used.

Figure 4:
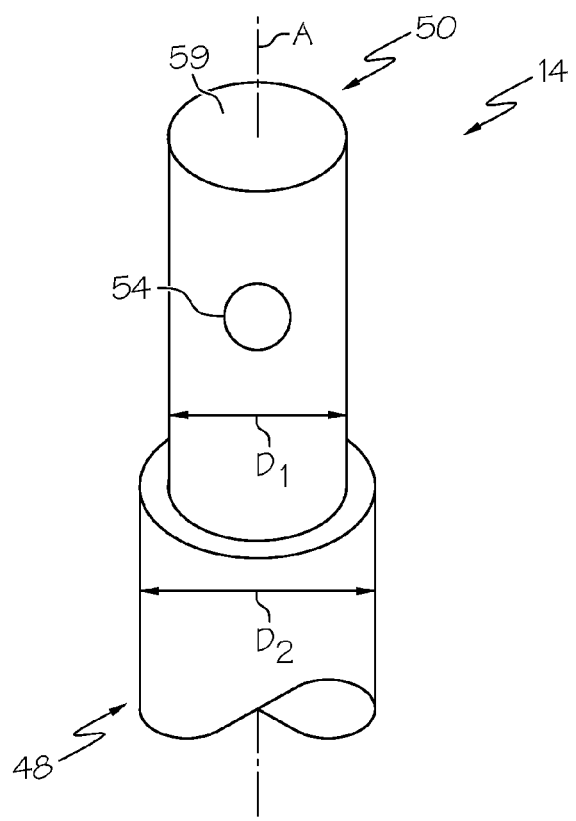
FIG. 4 illustrates a detail view of the solid durable core of FIG. 3 according to one or more embodiments shown and described herein.

Referring also to FIG. 4, the locking feature portions 50 and 52 may have an outer diameter $D_1$ that is less than an outer diameter $D_2$ of the hose-forming portion 48 so that the locking feature portions 50 and 52 are stepped-down from the hose-forming portion 48. As will be described below, this difference in $D_1$ and $D_2$ can, in some embodiments, be selected based on a desired wall thickness of the formed hose. In many embodiments, the size and shape of the locking feature portions 50 and 52 and the hose-forming portion 48 are accounted for in the virtual design 22 (i.e., part of the virtual design). The locking feature portions 50 and 52 (and hose-forming portion 48) may be machined and/or sanded to provide at least part of the difference in $D_1$ and $D_2$.

Each locking feature portion 50 and 52 may include an opening 54 and 56. The openings 54 and 56 may extend substantially transverse to and passing through the axis A and be spaced axially from ends 59 and 61 of the locking feature portions 50 and 52. The openings 54 and 56 are sized to receive a respective locking dowel 58 and 60 having a length that is greater than the length of their respective opening 54 and 56 such that the dowels can extend beyond the openings 54 and 56. The openings 54 and 56 may be formed during the rapid prototyping process and/or they may be formed after the rapid prototyping process, for example, by machining.

Figure 5:
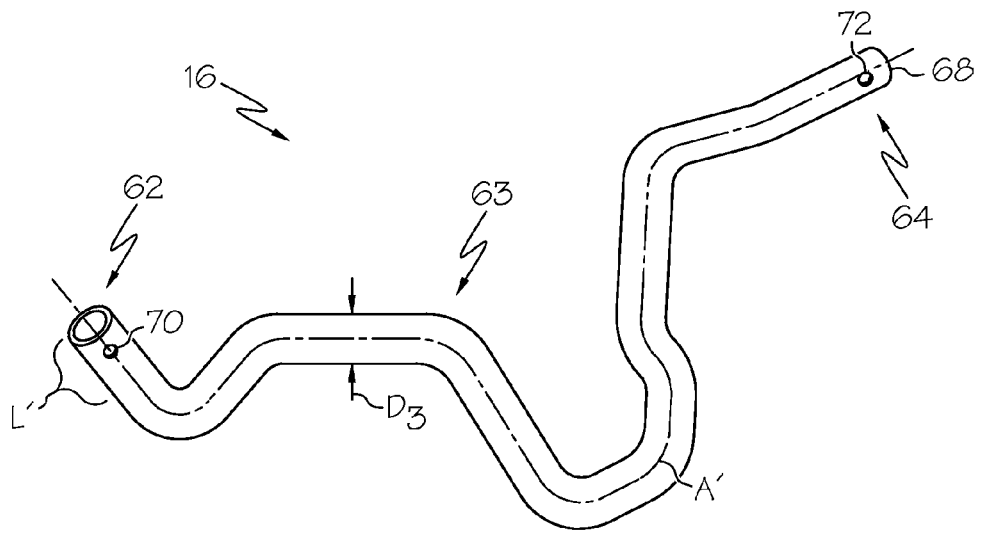
FIG. 5 illustrates a hollow sacrificial core according to one or more embodiments shown and described herein.

Referring now to FIG. 5, one exemplary embodiment of the hollow sacrificial core 16 formed using, for example, the SLA machine 12 is illustrated. Unlike the solid durable core 14, which may be solid throughout its length, the hollow sacrificial core 16 is hollow along its length. In some embodiments, the hollow sacrificial core 16 is hollow for substantially its entire length. However, the hollow sacrificial core 16 may have one or more solid core sections. The hollow sacrificial core 16 has an outer diameter $D_3$ that may be substantially the same as $D_1$ of the locking feature portions 50 and 52. As illustrated, the hollow sacrificial core 16 has a substantially constant $D_3$ along its length. However, the outer diameter may vary along the length of the hollow sacrificial core 16. In some embodiments, the wall thickness of the hollow sacrificial core 16 may be about five mm or less, such as about two mm, such as about one mm or less.

The hollow sacrificial core 16 has a main, hose-forming portion 63 and locking feature portions 62 and 64. In contrast to the hose-forming portion 48 and locking feature portions 50 and 52 of the solid durable core 14, the hose-forming portion 63 and the locking feature portions 62 and 64 of the hollow sacrificial core 16 may have about the same outer diameter $D_3$. The locking feature portions 62 and 64 may extend in the direction of a central axis A' of the hollow sacrificial core 16. In some embodiments, the locking feature portions 62 and 64 may each extend a length L' between about 50 mm and about 75 mm inwardly from respective ends 66 and 68, however, other extension distances less than 50 mm and greater than 75 mm can be used. In some embodiments, the lengths L' are substantially the same as (correspond to) the lengths L of the locking feature portions 50 and 52.

Each locking feature portion 62 and 64 of the hollow sacrificial core 16 may include an opening 70 and 72. The openings 70 and 72 may extend substantially transverse to and passing through the axis A' and be spaced axially from ends 66 and 68 of the locking feature portions 62 and 64. The openings 70 and 72 are sized to receive the locking dowel 58 and 60 having a length that is greater than the length of their respective opening 70 and 72 such that the dowels can extend beyond the openings 70 and 72. The openings 70 and 72 may be formed during the rapid prototyping process and/or they may be formed after the rapid prototyping process, for example, by machining.

Referring back to FIG. 1, the mold 18 is produced using the solid durable core 14. In some embodiments, the mold 18 may be a two-part mold having a first part 78 and a second part 80. Hose forming cavities 82 and 84 are formed in the first part 78 and the second part 80 for forming the hose in the desired shape. The mold 18 may be formed of any suitable material or combination of materials, such as silicone.

Figure 6F:
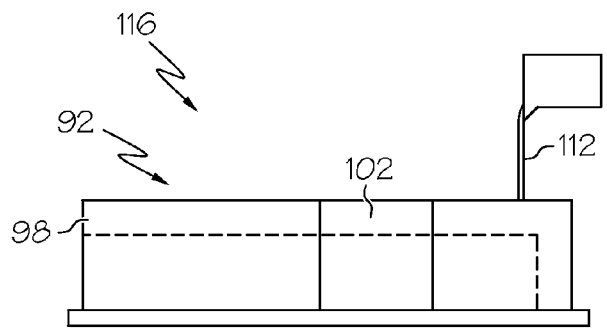
FIG. 6 illustrates a system and method of forming a mold according to one or more embodiments shown and described herein.
Figure 6G:
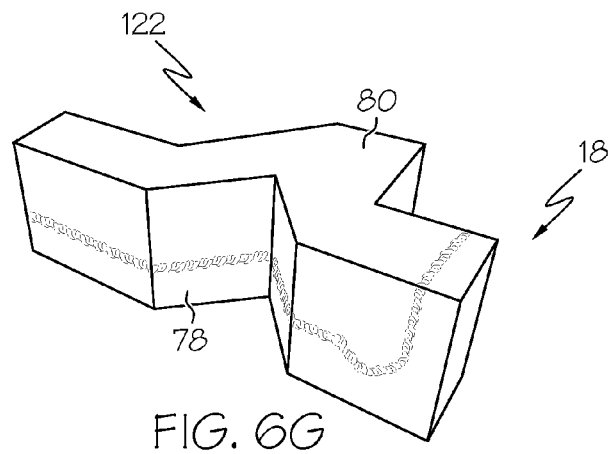
Figure 6H:
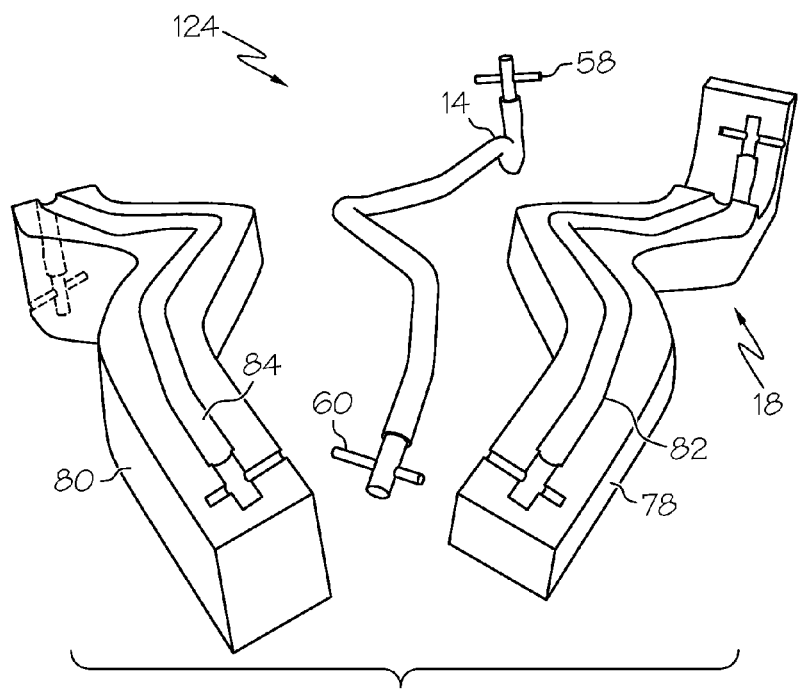

FIG. 6 illustrates one exemplary process of forming the mold 18 using the solid durable core 14 with the locking dowels 58 and 60 located in the openings 70 and 72. At step 86, a parting line represented by dashed line 87 is estimated that divides the solid durable core 14 into a top half 90 and a bottom half 92. In some embodiments, the parting line 87 may coextend with the axis A. A block 88 of putty or other suitable material may be formed around the bottom half at step 94 with the top half 90 exposed above a top surface 96 of the putty block 88. The top surface 96 is formed to coextend with the parting line 87. At step 105, the putty block 88 with the solid durable core 14 may be set on a plate 95 (e.g., of metal, glass, etc.) and a frame 98 may be built or otherwise placed about a periphery 100 of the putty block 88 and sealing thereagainst with sidewalls (only sidewalls 102 are illustrated) extending upwardly beyond the top half 90 of the solid durable core 14. In some embodiments, an interlocking forming feature 93 (e.g., a recess) may be formed (e.g., cut) into the top surface 96 of the putty block 88, which can be used to aid in alignment of the finished mold 18. At step 110, a mold-forming material 112, such as silicone, is poured into the frame 98, filling the volume above the top half 90 of the solid durable core 14 within the frame 98 and the mold-forming material 112 is allowed to set. Once the mold-forming material 112 hardens to form second part 80, the second part 80 is removed from the frame 98 and the putty block 88 is removed at step 114, exposing the bottom half 92 of the solid durable core 14. At step 116, the frame 98 may be set around the second part 80 with the sidewalls 102 extending upwardly beyond the exposed bottom half 92. In some embodiments, a top surface 118 of the second part 80 may be treated with a release agent, such as a wax release, and the mold-forming material 112 is poured into the frame 98, filling the volume above the bottom half 92 of the solid durable core 14 within the frame 98 and the mold-forming material 112 is allowed to set. Once the mold-forming material 112 hardens to form the first part 78, the first part 78 and the second part 80 are removed from the frame 98 at step 122. The mold 18 may be opened thereby exposing the solid durable core 14 and, at step 124, the solid durable core 14 with the locking dowels 58 and 60 is removed from the mold 18 thereby forming cavities 82 and 84. In some embodiments, the solid durable core 14 may be treated with a release agent prior to forming the mold 18. Additionally, vents and/or pour holes may be created, for example, through placement of rods during the mold forming process.

Figure 7:
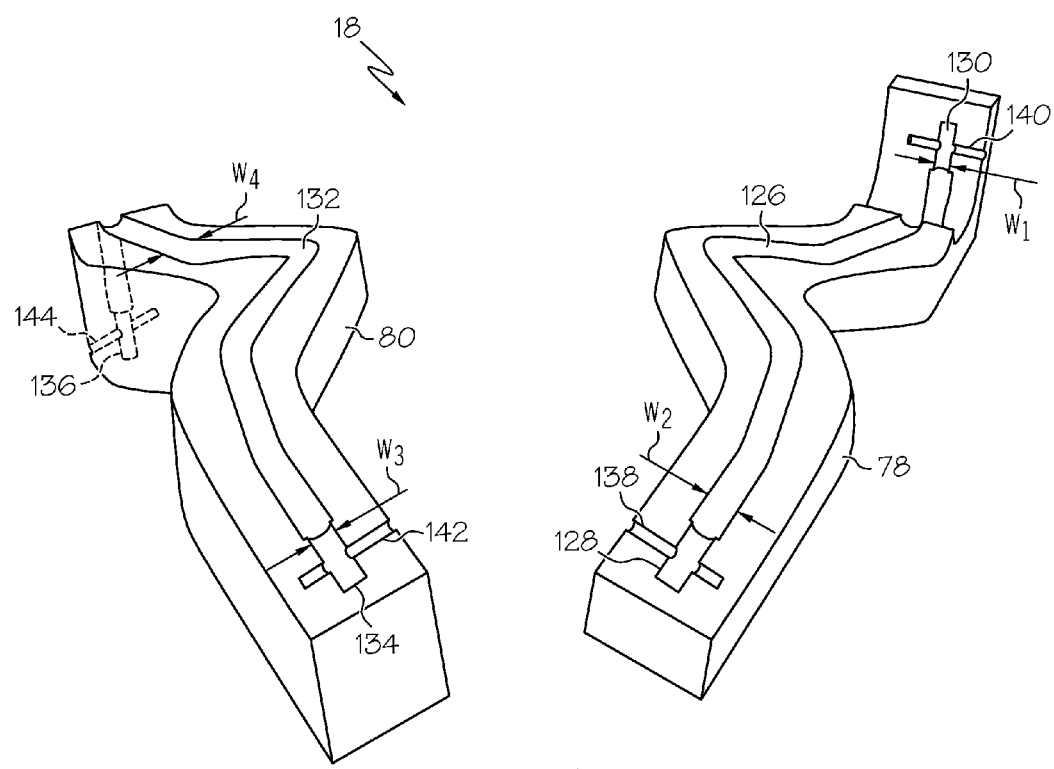
FIG. 7 illustrates a mold formed using the system and method of FIG. 6 according to one or more embodiments shown and described herein.
Figure 8A:
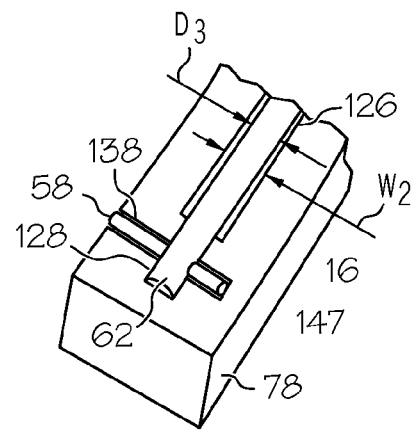
FIG. 8 illustrates a system and method for forming a hose using the mold of FIG. 7 according to one or more embodiments shown and described herein.
Figure 8B:
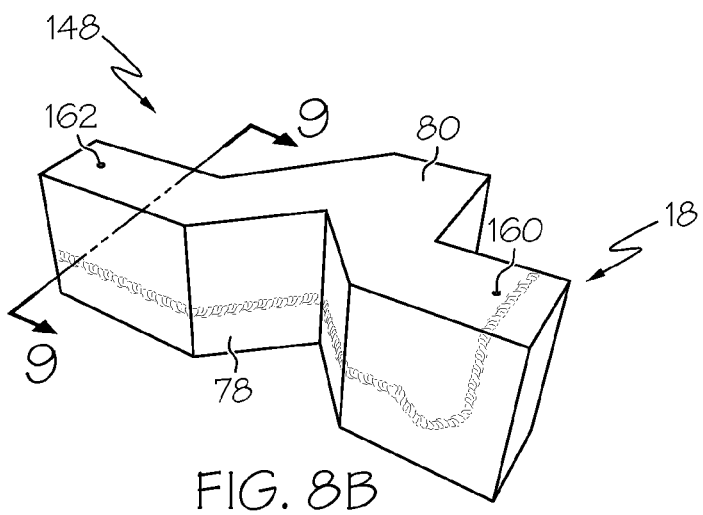
Figure 8C:
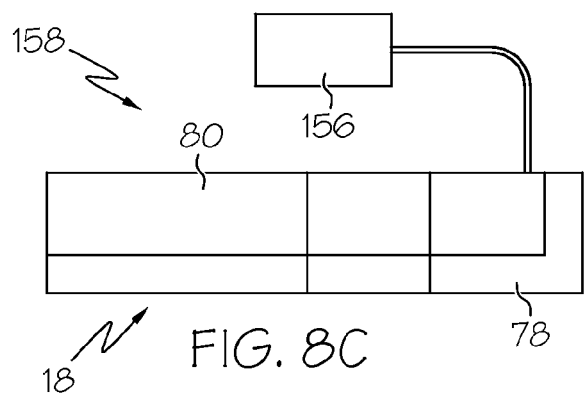
Figure 8D:
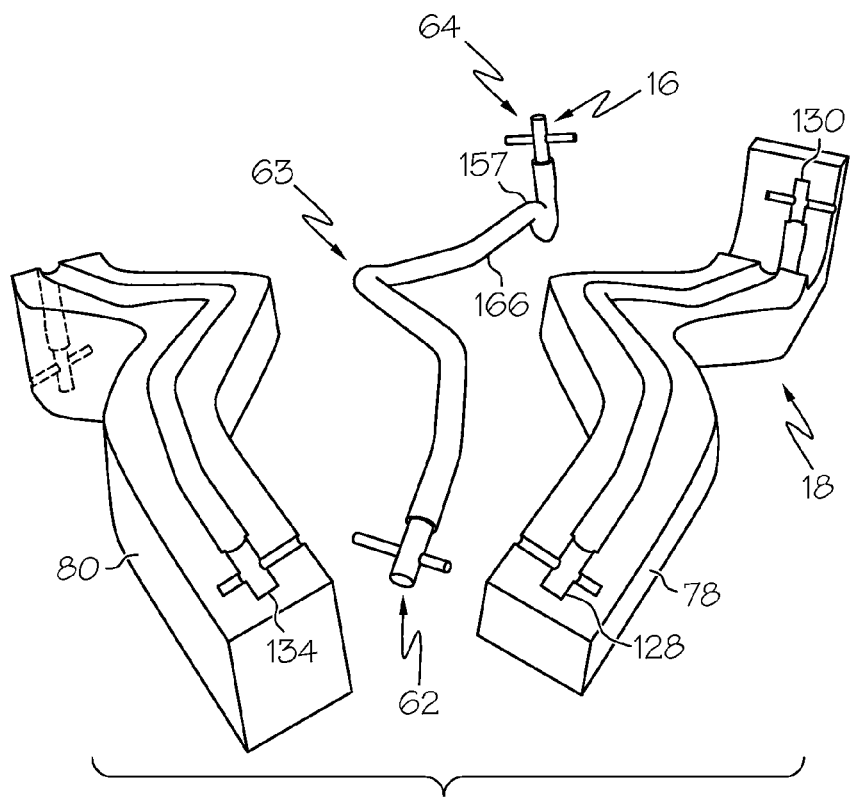
Figures 8E, 8F:
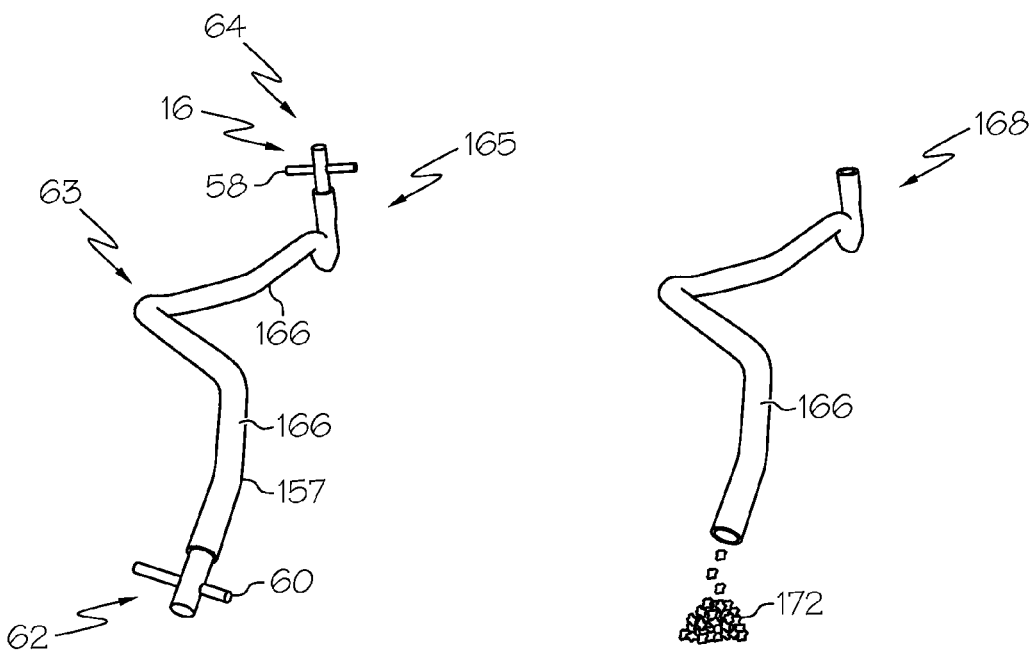

Referring to FIG. 7, the mold 18 is illustrated with the first part 78 separated from the second part 80 (the second part 80 is turned 180 degrees from the position in FIG. 6). The first part 78 includes a hose cavity forming portion 126 and locking feature receiving portions 128 and 130 having a width $W_1$ that is narrower than a width $W_2$ of the hose cavity forming portion 126. The second part 80 also includes a hose cavity forming portion 132 and locking feature receiving portions 134 and 136 having a width $W_3$ that is narrower than a width $W_4$ of the hose cavity forming portion 132. The differences in the widths are due to the difference of diameters $D_1$ and $D_2$ between the locking feature portions 50 and 52 and the hose-forming portion 48 of the solid durable core 14. The locking dowels 58 and 60 form dowel receiving recesses 138 and 140 in the first part 78 and dowel receiving recesses 142 and 144 in the second part 80. The dowel receiving recesses 138, 140, 142 and 144 are used to locate and align the hollow sacrificial core 16 when located in the mold 18.

Figure 9:
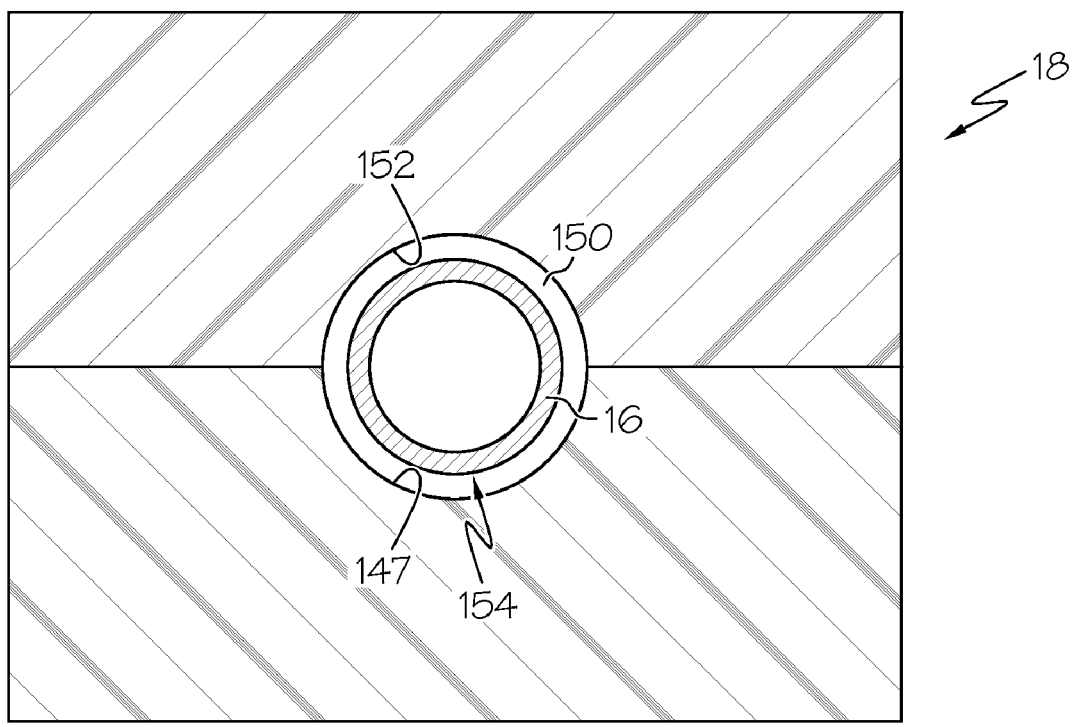
FIG. 9 illustrates a section view of the mold with hollow sacrificial core located therein along line 9-9 of FIG. 8 according to one or more embodiments shown and described herein.

FIG. 8 illustrates one exemplary process of forming the hose using the mold 18 and the hollow sacrificial core 16. At step 146, the hollow sacrificial core 16 is placed into the hose cavity forming portion 126 of the first part 78 with the locking feature portions 62 and 64 located in the locking feature receiving portions 128 and 130 and the locking dowels 58 and 60 located in the dowel receiving recesses 138 and 140. Because the outer diameter $D_3$ of the hollow sacrificial core 16 is less than the width $W_2$ of the hose cavity forming portion 132, the hollow sacrificial core 16 is suspended in the hose cavity forming portion 126 spaced from cavity wall 147. At step 148, the second part 80 of the mold 18 is placed over the hollow sacrificial core 16, locating the hollow sacrificial core 16 in the hose cavity forming portion 126, the locking feature portions 62 and 64 in the locking feature receiving portions 134 and 136 and the locking dowels 58 and 60 in the dowel receiving recesses 142 and 144 thereby completing the mold cavity 150. As can be seen by FIG. 9, the hollow sacrificial core 16 is suspended in the mold cavity 150 spaced from the cavity wall 147 and cavity wall 152. This spacing provides a volume 154 for receiving the hose forming material. The hose forming material (e.g., urethane) is then injected (e.g., poured) into the volume 154 of the mold cavity 150 at step 158 from a material source 156 through pour holes 160 and 162 that are in communication with the volume 154. While two pour holes 160 and 162 are illustrated, there may be more or less than two pour holes. In some embodiments, one of the two holes 160 and 162 may be a vent for allowing air to escape the mold cavity 150 while pouring the hose forming material 157 into the volume 154. The hose forming material is then allowed to cure within the volume 154.

At step 164, after the hose forming material has finished curing, the first part 78 and the second part 80 of the mold 18 are separated and the hollow sacrificial core 16 with the hose forming material 157 is removed from the mold cavity 150 at step 165. The hose forming material 157 is located about the hollow sacrificial core 16 forming the hose 166. The hose 166 is located in the hose-forming portion 63 of the hollow sacrificial core 16 with the locking feature portions 62 and 64 exposed due to the outer diameter $D_3$ being about the same as the widths $W_1$ and $W_3$ of the locking feature receiving portions 128, 130, 134 and 136. At step 168, the locking dowels 58 and 60 are removed from the openings 70 and 72 and the hollow sacrificial core 16 is destroyed, for example, by smashing the hollow sacrificial core 16 using a force applied to the hose 166. Because the hose 166 is formed of a flexible, resilient material, the hose 166 deflects upon application of the force thereby allowing the force to damage the hollow sacrificial core 16. The pieces 172 of the hollow sacrificial core 16 may then be removed from the interior of the hose 166 with the formed hose 166 in its final formed shape. In some embodiments, if the hose 166 is not acceptable, the hose 166 may be cut from the hollow sacrificial core 16 and the hollow sacrificial core 16 may be reused until an acceptable hose 166 is formed.

Figure 10:
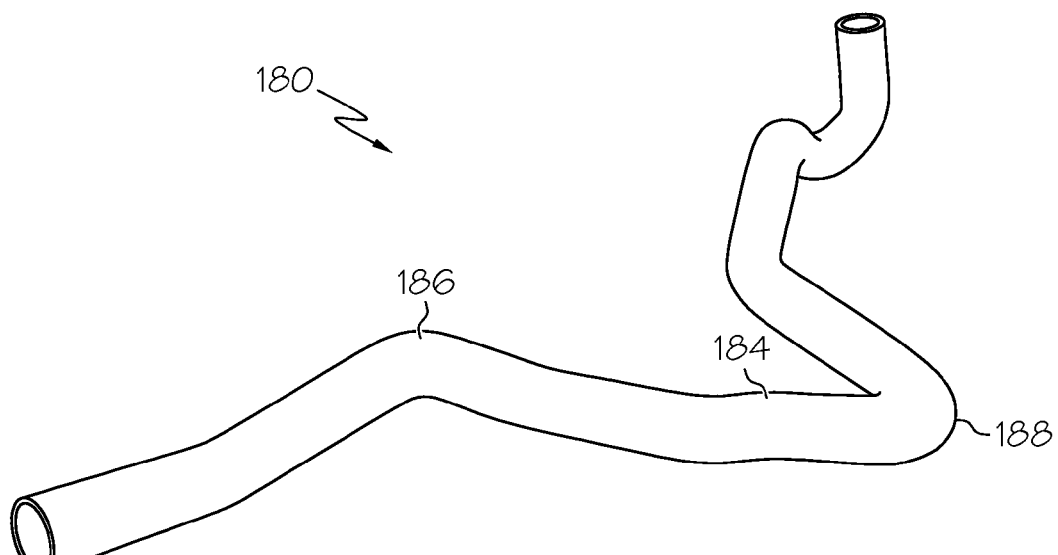
FIG. 10 illustrates a hose according to one or more embodiments shown and described herein.
Figure 11:
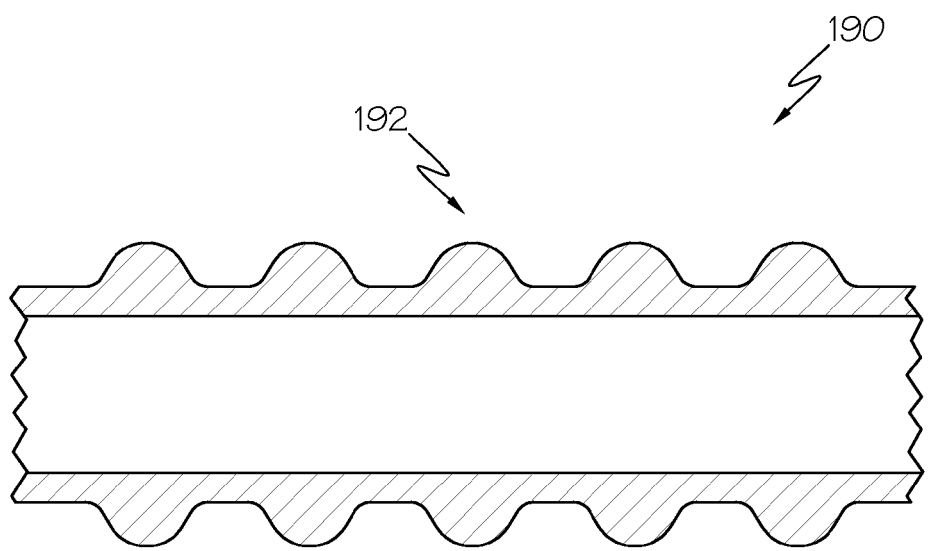
FIG. 11 illustrates another hose according to one or more embodiments shown and described herein.

Referring to FIGS. 10 and 11, a couple of exemplary soft formed hoses 180 and 190 are illustrated. Referring first to FIG. 10, the soft formed hose 180 generally has a bent tubular body 184, which may be formed of a flexible, resilient mold material, such as urethane. To illustrate one example, the soft formed hose 180 may include multiple bends (e.g., see bends 186 and 188) where some of the bends are greater than 90 degrees and others of the bends are less than 90 degrees. The soft formed hose 180 may have a substantially constant outer diameter and wall thickness. Referring to FIG. 11, another exemplary embodiment of the soft formed hose 190 has a changing outer diameter at sections 192 and may have a constant or varying wall thickness along its length. In some embodiments, combinations of bends, variable inner and/or outer diameters and varying wall thicknesses may be used to form a hose. In some embodiments, the hoses 166, 180 and 190 may be used in a vehicle, such as to direct engine fluids, conditioned air, etc.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of forming hoses, the method comprising:
generating a virtual design for at least one of a solid durable core and a hollow sacrificial core;
forming at least one of the solid durable core and the hollow sacrificial core using rapid prototyping;
forming a mold cavity using the solid durable core; and
forming the hose about the hollow sacrificial core with the hollow sacrificial core in the mold cavity;
wherein the step of generating the virtual design includes forming virtual designs for both the solid durable core and the hollow sacrificial core, the virtual design for the solid durable core including providing locking feature portions for the solid durable core and a hose forming portion located between the locking feature portions, the locking feature portions having a diameter that is less than a diameter of the hose forming portion.

2. The method of claim 1 further comprising destroying the hollow sacrificial core with the hollow sacrificial core in the hose.

3. The method of claim 2, wherein the hose is formed of a flexible hose forming material.

4. The method of claim 2, wherein the hose has a plurality of bends, at least one of the bends being greater than 90 degrees.

5. The method of claim 1, wherein the step of forming the mold includes forming a first part of the mold, then forming a second part of the mold, wherein at least one of the first part and the second part includes a hose cavity forming portion and locking feature receiving portions.

6. The method of claim 5 further comprising locating a locking dowel within an opening extending through one of the locking feature portions after the solid durable core is formed.

7. The method of claim 1, wherein the step of forming at least one of the solid durable core and the hollow sacrificial core using rapid prototyping includes forming both the solid durable core and the hollow sacrificial core simultaneously using rapid prototyping.

8. The method of claim 1, wherein the step of forming the mold using the solid durable core to form the mold cavity includes forming the mold cavity having a width that is greater than an outer diameter of the hollow sacrificial core.

9. A method of forming hoses, the method comprising:
forming a solid durable core and a hollow sacrificial core using rapid prototyping such that the solid durable core has a width within a hose forming portion of the solid durable core that is greater than a width of the hollow sacrificial core within a hose forming portion of the hollow sacrificial core;
forming a mold cavity using the solid durable core;
locating the hollow sacrificial core in the mold cavity, the hollow sacrificial core and mold cavity sized to provide a hose forming volume in the mold cavity with the hollow sacrificial core located in the mold cavity, the hose forming volume formed by the difference between the widths of the solid durable core and the hollow sacrificial core within their respective hose forming portions; and
providing a hose forming material in the hose forming volume such that the hose forming material surrounds the hollow sacrificial core;
wherein the step of forming the solid durable core includes forming the solid durable core to include the hose forming portion located between locking feature portions of the solid durable core, the locking feature portions having a diameter that is less than a diameter of the hose forming portion.

10. The method of claim 9, wherein the step of locating the hollow sacrificial core in the mold cavity comprises supporting the hollow sacrificial core in the mold cavity such that a hose forming portion of the hollow sacrificial core is suspended within the mold cavity.

11. The method of claim 9 further comprising locating a locking dowel within an opening extending through one of the locking feature portions.

12. The method of claim 11 further comprising forming a first part of the mold, then forming a second part of the mold, wherein at least one of the first part and the second part includes a hose cavity forming portion and locking feature receiving portions.

13. A method of forming hoses, the method comprising:
forming a solid durable core and a hollow sacrificial core using rapid prototyping;
forming a mold cavity using the solid durable core;
locating the hollow sacrificial core in the mold cavity, the hollow sacrificial core and mold cavity sized to provide a hose forming volume in the mold cavity with the hollow sacrificial core located in the mold cavity; and
providing a hose forming material in the hose forming volume such that the hose forming material surrounds the hollow sacrificial core;
wherein the step of forming the solid durable core includes forming the solid durable core to include a hose forming portion located between locking feature portions, the locking feature portions having a diameter that is less than a diameter of the hose forming portion.

14. The method of claim 13, wherein the step of locating the hollow sacrificial core in the mold cavity comprises supporting the hollow sacrificial core in the mold cavity such that a hose forming portion of the hollow sacrificial core is suspended within the mold cavity.

15. The method of claim 13 further comprising locating a locking dowel within an opening extending through one of the locking feature portions.

16. The method of claim 15 further comprising forming a first part of the mold, then forming a second part of the mold, wherein at least one of the first part and the second part includes a hose cavity forming portion and locking feature receiving portions.

* * * * *